Nov. 14, 1939.   C. A. ROYS   2,179,672

METHOD OF MAKING LOAVES OF BREAD

Original Filed Dec. 7, 1937

Inventor.
Claude A. Roys
by Heard Smith & Tennant
Attys.

Patented Nov. 14, 1939

2,179,672

UNITED STATES PATENT OFFICE 2,179,672

METHOD OF MAKING LOAVES OF BREAD

Claude A. Roys, Wellesley Hills, Mass.

Original application December 7, 1937, Serial No. 178,496. Divided and this application March 1, 1939, Serial No. 259,273

3 Claims. (Cl. 107—54)

This invention relates to the standard loaf of bread furnished by commercial bakers and in daily use in tremendous quantities.

Loaves of bread baked and sold commercially are universally required by law to be of a standard weight with a standard prescribed by the statute or with a standard adopted by the baker and plainly marked upon a loaf of bread or its wrapper.

These loaves of bread are universally baked each as a unit article with the entire outer surface of the loaf covered by a crust formed in the baking operation. These loaves of bread are now extensively furnished in sliced form and when not so furnished are cut into slices by the user. In either case the two end slices, the outer surfaces of which are covered with a crust, usually thick and hard, and which are commonly known as the "heels", are considered by the user of little value as compared with the other slices and are generally discarded or thrown away, thus resulting in an enormous waste. The amount of this wastage can be visualized by considering a specific example. An ordinary standard weight for a loaf of bread is twenty ounces and sells at retail at the present time for 12¢. Such a loaf, when furnished commercially in sliced form, usually comprises twenty-three slices and of these the two end slices with their relatively heavy crust weigh about two ounces, or one-tenth of the total weight of the standard loaf. Even a small commercial bakery will turn out twenty thousand of such loaves per day. If, then, as experience has shown is usually the case, the end crust slices are wasted, there is a loss to the customers of such a small bakery of forty thousand ounces or $240 each day. When the enormous amount of bread baked and sold commercially is considered, it will be seen that even if only a part of the end crust slices are wasted, the total daily waste reaches an enormous figure.

The present invention has for its object to reduce to a minimum, and under the most efficient conditions practically to eliminate, this wastage and, furthermore, to do this without increasing and even by reducing the cost of manufacture to the baker.

The invention has for its object, therefore, to eliminate the end crust slices and produce a loaf of bread of standard weight, all slices of which are of equal characteristics and desirability to the customer.

The nature and objects of the invention will appear more fully from the accompanying description and drawing and will be particularly pointed out in the claims.

In this invention the bread is baked in the form of a continuous or substantially endless bar and by these terms it is meant that the baked bar shall be of a very considerable length as compared with the length of a standard loaf. Preferably this baked bar may be sufficiently continuous to form hundreds of standard loaves with a wastage of only two end crust slices at the beginning and end of the baking operation, but even if this baked bar had a continuity sufficient only to form ten such loaves, the loss by discarding the two end crust slices would only be $86/100$ of 1% as compared with a loss of 10% when such ten loaves are separately baked.

Figure 1:
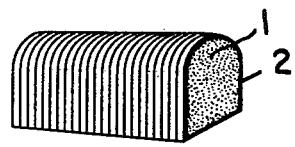
Fig. 1 is a view in perspective of a standard commercial loaf of bread weighing twenty ounces and divided into twenty-three slices such as produced by the method of the present invention.

A loaf of commercial bread embodying the invention may or may not be divided into slices before being delivered to the customer, but in accordance with the very general practice the sliced form is illustrated in Fig. 1. Therein is shown a loaf of bread produced by this invention. Such a loaf is of one of the standard weights such as required by law or established by custom. The loaf comprises a core or central portion 1 and a circumferential crust 2 extending entirely around the circumference or periphery of the loaf. The cross sectional shape of the loaf illustrated is that most commonly in use in which the peripheral crust is compressed at the sides and bottom and uncompressed at the top. The essential characteristic of the loaf is that the entire core is baked in continuity and extends between the two end faces of the loaf so that these two end faces are baked in situ without crusts. Thus the ends of the core appearing at the end faces of the loaf are uncrusted and homogeneous with the body of the core. In the preferred form illustrated, wherein the loaf is divided into slices, it will be seen that the loaf consists of a plurality of slices with their faces in contact while the exposed faces of the end slices appearing at the ends of the loaf have similar characteristics to the other faces of the end slices and to the faces of the intermediate slices. That is, both faces of the end slices have similar characteristics to the faces of the intermediate slices so that all of the slices making up the entire loaf have two crustless faces. The entire number of slices making up the loaf are baked in continuity and each slice is provided with a crust only at its periphery. The invention thus produces a loaf of bread of a standard weight baked without end crusts, thus eliminating the wastage due to the presence of end crusts and presenting a loaf of bread in which all portions and, when sliced, all slices, are of the same characteristics and equally available for use and consumption.

Loaves of bread produced by this invention may be composed of any of the usual or suitable materials employed in bread and the bread may be made according to any usual or suitable recipe.

Figure 2:
Fig. 2 is a view in perspective of the loaf of bread shown in Fig. 1 provided with the moisture-resistant wrapper.

The loaf of bread, particularly when sliced, is furnished to the customer wrapped to protect it from impurities and also to hold the slices in contact with each other and to protect the end faces of the loaf and maintain these end faces in condition similar to that of the faces of the intermediate slices. For this purpose the loaf may be wrapped, as shown in Fig. 2, with a suitable wrapper 3 of moisture-resistant material such as the waxed paper commonly employed for wrapping. This wrapper is applied to the loaf so as closely to engage with its surface and the ends are folded up against the end faces of the loaf so as to engage therewith and the entire wrapper is sealed by applying heat which softens the wax component of the wrapper and causes the folded portions to adhere. But any suitable wrapper for protecting the loaf and maintaining the condition of the end faces may be employed.

In order to make loaves of bread in accordance with this invention, a continuous or substantially endless bar of bread is baked and this continuous bar is then divided into loaf sections of standard weight. In the preferred form, each of these standard weight loaf sections is also divided into the desired or predetermined number of slices. The baking of this continuous bar of bread and its division into standard weight loaf sections and the division of the loaf section into the predetermined number of slices may be performed, specifically considered, by any suitable means and apparatus. The novel and preferred method consists in progressively forming a continuous or substantially endless bar of dough, progressively baking this bar of dough with only its sides and bottom confined to compress the crust at the sides and bottom only, severing therefrom successive loaf sections of standard weight, and preferably dividing these loaf sections into a predetermined number of slices.

Figure 3:
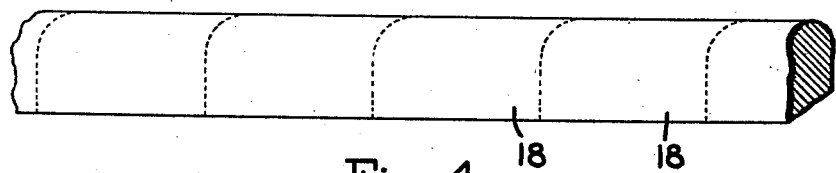
Fig. 3 is a view in perspective of a continuous or substantially endless bar of baked bread with the position of individual loaves to be formed therefrom indicated by the dotted lines.
Figure 4:
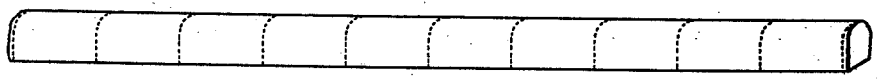
Fig. 4 is a view similar to Fig. 3 on a smaller scale of a continuous or substantially endless bar of baked bread to be divided into ten standard loaves, as indicated by dotted lines, with only two end crusts discarded.
Figure 5:
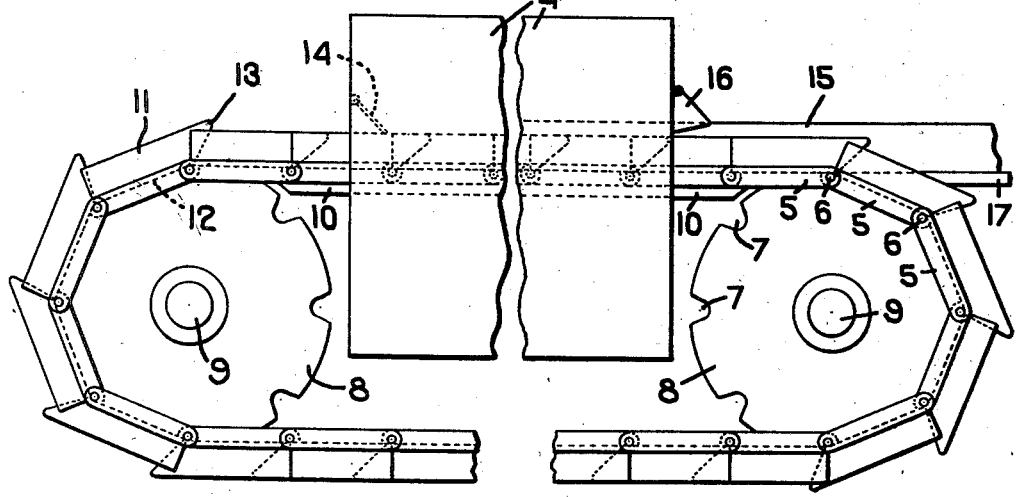
Fig. 5 is a view in side elevation and chiefly in diagrammatic form illustrating a simple form of apparatus for baking a continuous or substantially endless bar of bread.

One simple and preferred form of apparatus for carrying out the method is diagrammatically illustrated in Fig. 5 to produce the continuous baked bar, a portion of which is illustrated in Fig. 3.

In the apparatus of Fig. 5, an oven 4 is indicated which may be of any desired size, made of any suitable materials, heated by any suitable means, and of a sufficient length to secure the proper baking of dough fed in at one end and withdrawn at the other. As a simple means for passing the dough through the baking oven, there is shown an endless conveyor made up of links 5 pivoted together at 6 and carrying rollers fitting in the grooves 7 of sprocket wheels 8, one of which is located adjacent the entrance and the other adjacent the exit of the oven. These sprocket wheels are carried by shafts 9 and rotated by any suitable means at a speed to pass the dough through the oven and secure in correlation with the size and character and temperature of the oven the baking of the bread. The conveyor is shown as running over a suitable support 10 extending through the oven.

The endless conveyor is shown as provided with a continuous, segmental, open top pan, the cross section of which is of the required size and there may, of course, be as many of these segmental pans located widthwise of the oven as required. As illustrated, each segment of the pan is made up of side walls 11 and a bottom wall 12 and these segments are suitably mounted upon the links 5 or the pivots 6. As illustrated, the forward ends of the walls 11 are extended as at 13 so that the side walls of successive segments are always overlapping. It will thus be seen that as the endless conveyor comes into horizontal position and passes over the support 10 between the sprocket wheels, these pan segments form a continuous open top pan or trough, a cross section of which corresponds to the cross section of a pan required for the size of the loaf.

The dough is fed into this continuous pan or trough just before the endless conveyor enters the oven and the dough may be supplied progressively in any suitable manner, either in a continuous stream or by placing in the pan or trough in a continuous succession lumps or portions of dough which unite, as the pan moves into and through the oven, to form the continuous bar of dough. A swinging door or valve 14 riding on the top of the pan at the entrance to the oven assists in closing the entrance to the oven.

As the endless conveyor proceeds through the oven, the dough is progressively baked into a continuous bar 15 and emerges from the oven in this form, a hood 16 pivoted at the exit from the oven assisting in closing that exit. As the baked bar of bread 15 passes out from the oven, it slides onto a suitable table or support 17 so that as the endless conveyor continues around the sprocket wheel 8, the baked bar is separated from the continuous pan and is ready to be divided into loaf sections.

A portion of the baked bar as it comes from the oven is shown in Fig. 3. This bar is divided into loaf sections 18 of the standard weight by any suitable means and simultaneously therewith or subsequently thereto these loaf sections are preferably divided into a predetermined number of slices by any suitable means. Thereafter the loaf sections are wrapped by any suitable means, as already described.

With an apparatus such as that described, it will be seen that a bar of baked bread of indeterminate length may be produced so that the two end crusts produced, the one when the bar starts and the other when it ends, form but a microscopic proportion of the bar. But the bar of baked bread may be one in which the number of loaf sections divisible from this bar is sufficiently great to cause the crusts formed at the two ends to be but a very small fraction of the total weight.

This application is a division of application Serial No. 178,496, filed December 7, 1937.

Having thus described the invention, what is claimed as new, and desired to be secured by Letters Patent, is:

1. The method of making loaves of bread of standard weight without end crusts which consists in progressively forming a continuous substantially endless bar of dough, progressively baking the said bar with only its sides and bottom confined, and severing from the baked portion of said bar successive loaf sections of the standard weight.

2. The method of making standard weight loaves of bread composed entirely of slices without end crusts which consists in progressively forming a continuous substantially endless bar of dough, progressively baking the said bar with only its sides and bottom confined, and cutting the baked portion of said bar into contiguous sliced sections of the standard weight each composed of a predetermined number of slices.

3. The method of making standard weight loaves of bread without end crusts which consists in feeding the dough into a substantially endless open-top traveling pan, progressively to form a continuous substantially endless bar of dough, progressively baking the said bar to form a substantially endless bar of baked bread of substantially uniform cross section, progressively removing the bar of baked bread from the pan, performing the aforesaid steps as a continuous process and thereafter dividing the baked bar into loaf sections of standard weight composed of similar slices.

CLAUDE A. ROYS.